(12) United States Patent
Beggy et al.

(10) Patent No.: US 10,936,685 B2
(45) Date of Patent: *Mar. 2, 2021

(54) POLL-BASED NETWORKING SYSTEM

(71) Applicant: TRINITY INFO MEDIA, LLC, Pittsburgh, PA (US)

(72) Inventors: Timothy Beggy, Pittsburgh, PA (US); David Shaun Neal, Tuxedo, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/025,840

(22) Filed: Jul. 2, 2018

(65) Prior Publication Data
US 2019/0012389 A1 Jan. 10, 2019

Related U.S. Application Data

(63) Continuation-in-part of application No. 14/987,447, filed on Jan. 4, 2016, now Pat. No. 10,019,722, which
(Continued)

(51) Int. Cl.
| | |
|---|---|
| *G06F 16/9535* | (2019.01) |
| *H04L 29/08* | (2006.01) |
| *G06F 17/30* | (2006.01) |
| *H04L 29/06* | (2006.01) |
| *G06Q 10/10* | (2012.01) |
| *G06F 3/01* | (2006.01) |
| *G06F 16/00* | (2019.01) |

(Continued)

(52) U.S. Cl.
CPC ........... *G06F 16/9535* (2019.01); *G06F 3/01* (2013.01); *G06F 16/00* (2019.01); *G06F 16/245* (2019.01); *G06F 16/248* (2019.01); *G06F 17/30* (2013.01); *G06F 17/30424* (2013.01); *G06F 17/30554* (2013.01); *G06F 17/30867* (2013.01); *G06Q 10/10* (2013.01); *H04L 65/403* (2013.01); *H04L 67/22* (2013.01); *H04L 67/26* (2013.01); *H04L 67/306* (2013.01); *H04L 29/06* (2013.01); *H04L 29/08* (2013.01)

(58) Field of Classification Search
CPC ......... G06F 16/951; G06F 3/01; G06Q 10/10; H04L 29/06
See application file for complete search history.

(56) References Cited

U.S. PATENT DOCUMENTS

| | | | | |
|---|---|---|---|---|
| 2009/0287763 | A1* | 11/2009 | Svendsen | G06Q 30/02 709/203 |
| 2018/0330408 | A1* | 11/2018 | Bennett | G06F 16/951 |

* cited by examiner

*Primary Examiner* — Cao H Nguyen
(74) *Attorney, Agent, or Firm* — Risso I.P.

(57) ABSTRACT

Described is a poll-based system that provides an on-line and mobile network of users and products, goods and services that are determined through polling each of the users. The system compares, in real-time, the current user's polling responses to identify which most similarly match the answered questions to that of the user. As the user progressively answers questions, the system updates the matching and presentation other users and of products, goods and services. Thus, as the user answers polling questions, the selected answers are compared against the selected descriptions of other products, goods and services, or general questions, to generate a likelihood of match between the users, and also each of the products, goods and services. The profiles of products, goods and services that have a likelihood of match within a predetermined threshold are then presented, including links within the profile for specific purchases.

27 Claims, 9 Drawing Sheets

Related U.S. Application Data is a continuation-in-part of application No. 14/789,115, filed on Jul. 1, 2015, now Pat. No. 9,230,032, which is a continuation of application No. 12/951,332, filed on Nov. 22, 2010, now Pat. No. 9,087,321.

(60) Provisional application No. 61/309,038, filed on Mar. 1, 2010.

(51) Int. Cl.
*G06F 16/245* (2019.01)
*G06F 16/248* (2019.01)

POLL-BASED NETWORKING SYSTEM

CROSS-REFERENCE TO RELATED APPLICATIONS

This is Continuation-in-Part application of U.S. application Ser. No. 14/987,447, filed on Jan. 4, 2016, issuing as U.S. patent Ser. No. 10/019,722, which is a Continuation-in-Part application of U.S. application Ser. No. 14/789,115, filed on Jul. 1, 2015, now issued as U.S. Pat. No. 9,230,032, which is a Continuation Application of U.S. application Ser. No. 12/951,332, filed on Nov. 22, 2010, now issued as U.S. Pat. No. 9,087,321, which is a non-provisional application of U.S. Provisional Application No. 61/309,038, filed on Mar. 1, 2010.

FIELD OF INVENTION

The present invention relates to a networking system and, more particularly, to a networking system that matches users to people, products, good, and services based on similarities as determined through poll answering and provides real-time results in the form of a matching number to the users.

BACKGROUND OF INVENTION

With the advent of the internet and mobile phones, a plethora of social networking sites, ecommerce sites and mobile apps have been established. By way of example. Facebook, Amazon and eBay are internet-based-networking and ecommerce sites and mobile apps that allow users to create and participate in social and ecommerce networks. Such social networking and ecommerce sites share several common characteristics in that they allow users to create profiles, find other users or products and share information to users about themselves or products, goods and services.

In finding products, goods or services, existing sites and mobile apps allow users to search various fields of categories. For example, Amazon allows users to search through a database to identify products in a specific category like office furniture or bedroom furniture. Alternatively, such sites may display multiple sub-categories within a category. In providing such options, the site is querying or polling the user to match the user with similar user profiles, products, goods or services.

While the sites and mobile apps may offer options of categories to choose from to the user, such sites and mobile apps do not provide a progressive poll query that, in real-time, matches the user, to an exact number, with people, products, goods or services based upon all of the polls taken. In other words, existing sites and mobile apps maintain a database with user profiles. When a new user registers on an existing site or mobile app, the site or mobile app may attempt to match the user profile with existing user profiles or products as stored on a database based on searches. While such existing sites match a user profile against predefined categories, they do not progressively poll and match to an exact number of same poll answers of the user against all other user profiles, products, goods and services after each query item.

Thus, a continuing need exists for a poll-based networking system that, includes matching logic that is operable for matching and displaying an exact number of same poll answers, in real-time, for a user with other user profiles, products, goods and services based upon all of the polls taken by the user about opinions of general topics or products, goods and services.

SUMMARY OF INVENTION

The present invention is directed to a poll-based networking and ecommerce system that connects users to other users, or products, goods and/or services based on similarities as determined though poll answering and provides real-time results to the users. While considering the failure of others to make use of all of the above components in this technology space, the inventors unexpectedly realized that using a plurality of match servers, or through a single match server, would allow the system to quickly connect the users with an exact number to other users, or products, goods and/or services based on their coinciding matching answers.

Thus, the present invention includes a data processing system having one or more processors and a memory. The memory is specifically encoded with instructions such that when executed, the instructions cause the one or more processors to perform operations of:

receiving user information from a user to generate a unique user profile for the user;

providing, the user a first polling question, the first polling question having a finite set of answers and a unique identification;

receiving and storing a selected answer for the first polling question;

comparing the selected answer against other users, or the profile descriptors of products, goods and or services, based on the unique identification, to generate a likelihood of match, to an exact number, between the user and other users or products, goods and/or services; and displaying to the user the profiles of other users that have a likelihood of match within a predetermined threshold.

Additionally, the one or more processors are further configured to perform operations of:

providing the user with a next polling question, the next polling question having a finite set of answers and a unique identification;

receiving and storing a selected answer for the next polling question;

cumulatively comparing the selected answer for the first polling question and the next general or specific polling question against the selected answers of other users or products, goods and/or services to generate a likelihood of match, to an exact number, between the user and ecommerce products, goods and services;

displaying to the user the profiles of other users or products, goods and, services that have a likelihood match within a predetermined threshold; and repeating the process for a plurality of next polling questions.

In cumulatively comparing, the one or more processors are further configured to perform operations of:

matching the user to other users based on general questions, or products, goods and/or services based upon all of the selected answers by the user and all of the selected descriptions of products, goods and/or services, based on the unique identification, such that all of the selected answers by the user are compared to all of the profile descriptors of products, goods and/or services, based on the unique identification; and generating a likelihood of match to an exact number between users and/or each of the products, goods and/or services, based on the unique identification.

Additionally, in generating a likelihood of match between users and/or each of the products, goods and/or services, based on the unique identification as an exact matching number, the one or more processors are further configured to perform operations of:

determining a total number of polling questions as taken by the user;

determining a number of matched answers between users, or the selected profile descriptors of products, goods and/or services, based on the unique identification; and displaying the number of matched answers by the total number of polling questions to generate an exact number between the users, and, also the products, goods and/or services, based on the unique identification.

The system is also operable for performing operations of:

receiving match commands to identify users that fall within a maximum and minimum match number between the users, and also products, goods and/or services, based on the unique identification; and displaying to the user a maximum number of users, products, goods and/or services that fall within the maximum and minimum matching number.

In another aspect, the one or more processors are also configured to perform operations of:

collecting the selected answers with a web server and storing the selected answers in a database;

upon receipt of a selected answer, separately transmitting the selected answer from the web server, through a match aggregator, to a plurality of match servers, or with a single match server, the match server being assigned a distinct subset of users, or products, goods and/or services, based on the unique identification, such that a match server compares the selected answer of the user against other users or the selected descriptions of products, goods and/or services, based on the unique identification in its distinct subset to generate a likelihood of match between the users and each of the products, goods and/or services, distinct subset;

receiving in the match aggregator, from each match server, or a single match server, a likelihood of match between the user and products, goods and/or services, in the distinct subset;

compiling the likelihood of matches from the plurality of match servers, or a single match server, to generate the likelihood of match between the users and each of the products, goods and/or services; and transmitting the likelihood of match between user profiles, and/or each of the products, goods and/or services to the server for further processing.

Finally, the present invention also includes a computer implemented method and a corresponding computer or mobile phone program product. The method comprises an act of causing a computer or mobile phone having one or more processors and a memory specifically encoded with computer executable instruction means to execute the instruction means to cause the one or more processors to perform the operations described herein, while the computer program product comprises computer-readable instruction means stored on a non-transitory computer-readable medium that are executable by a computer for causing the computer to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
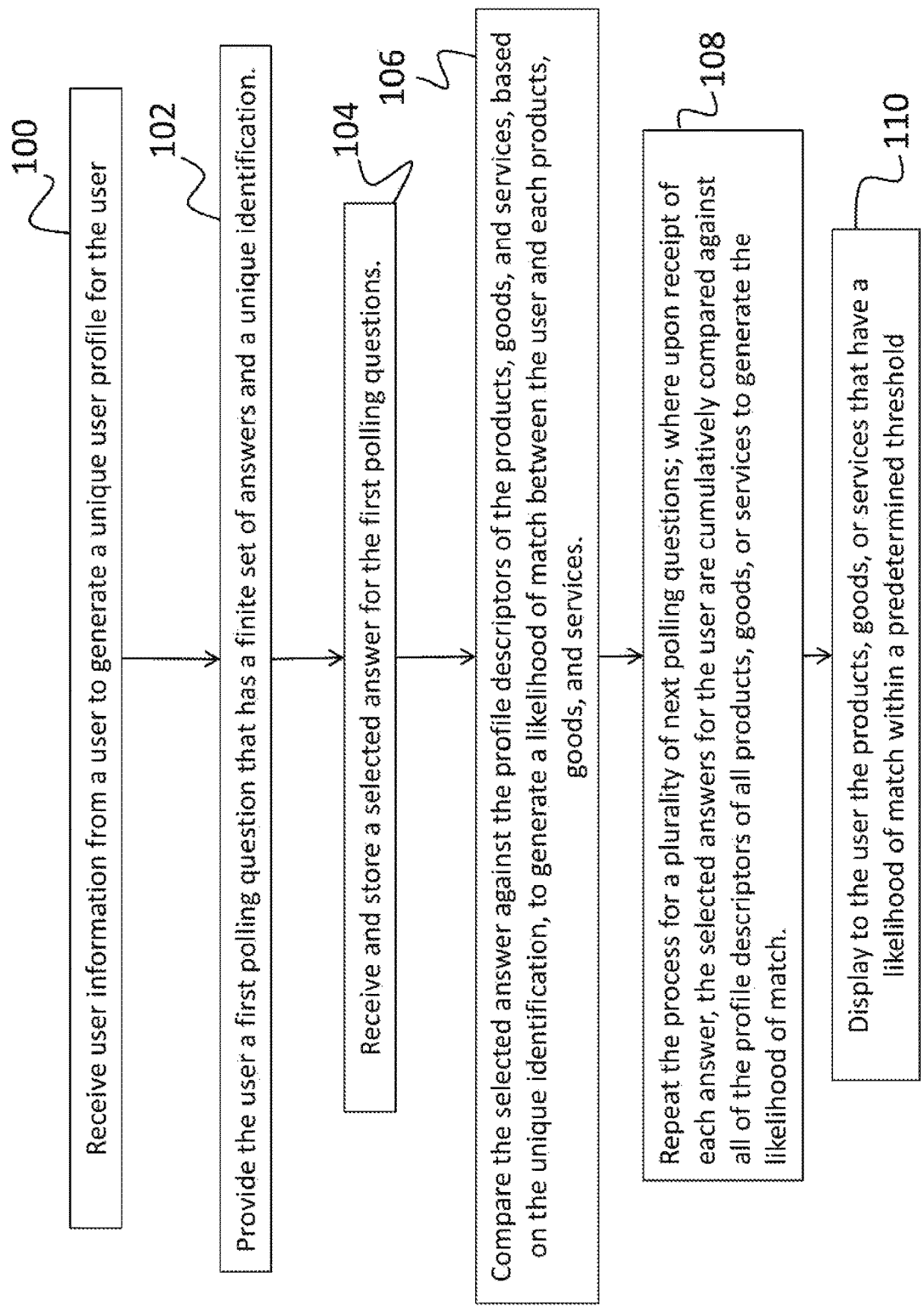
FIG. 1 is a flow chart depicting a process for poll-based networking according to the present invention.

The present invention relates to a networking system and, more particularly, to a networking and ecommerce system that connects users to other user profiles, or to products, goods and or services based on similarities as determined through poll answering and provides real-time results to the users in the form of an exact matching number. The following description is presented to enable one of ordinary skill in the art to make and use the invention and to incorporate it in the context of particular applications. Various modifications, as well as a variety of uses in different applications will be readily, apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly, stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is, not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Next, details of the present invention are provided to give an understanding of the specific aspects. Finally, a conclusion is presented.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Alternative—The term "alternative" as used with respect to this invention generally indicates an embodiment that is not equivalent to another embodiment.

Embodiment—The term "embodiment" means an embodiment that serves to illustrate by way of example but not limitation.

Instruction Means—The term "instruction means" or "instructions" as used with respect to this invention generally indicates a set of operations to be performed on a computer, and may represent pieces of a whole program or individual, separable, software modules. Non-limiting examples of "instruction means" or "instructions" include computer program code (source or, object code) and "hard-coded" electronics (i.e. computer operations coded into a computer chip). The "instruction means" (or instructions) may be stored in the memory of a computer or on a non-transitory computer-readable medium such as a floppy disk, a CD-ROM, and a flash drive (or any other non-transitory computer readable medium).

Polling Question—The term "polling question" as used with respect to this invention generally indicates a question that has multiple answers. The polling question is presented to the user for selection of one of the answers.

(2) Principal Aspects

The present invention has three "principal" aspects. The first is poll-based networking system. The networking system is typically in the form of a computer system or mobile app having one or more data processors operating software or in the form of a "hard-coded" instruction set. This system may be incorporated into a wide variety of devices that provide different functionalities. The second principal aspect is a computer or mobile app implemented method, typically in the form of software, operated using a data processing system (computer or computers). The third principal aspect is a computer or mobile phone program product. The computer or mobile phone program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories, DDR3 SDRAM (double data rate third generation synchronous dynamic random access memory), or RAM on mobile phones and LPDDR2 (low-power double data rate $2^{nd}$ generation) or SD cards. These aspects will be described in more detail below.

(3) Introduction

The present invention relates to a poll-based networking and ecommerce system. The system provides an on-line or mobile network of friends and products, goods and/or services that are determined through polling each of the users. As an improvement over the prior art, the present invention polls a user with a variety of questions. After providing an answer to each question, the system compares, in real-time, the current user's responses with all other users or to the descriptions of products, goods and/or services, based on the unique identification, to identify those products, goods and/or services that most similarly match the answers to that of the current user. As the current user progressively answers additional questions, the system progressively updates the matching and presentation of similar products, goods and/or services. As such, as the current user navigates the website or mobile app by answering polling questions, the selected answers are compared against the selected answers of other users, or of other descriptions of products, goods and/or services, based on the unique identification, to generate a likelihood of match between the user and each of the other products, goods and/or services. The users or products, goods and/or services that have a likelihood of match within a predetermined threshold are then presented to the current user in the form of an exact matching number.

To provide real-time polling and matching, the present invention includes a unique matching logic that enables the system to efficiently manage a large number of members/users/products/goods/services. The system is provided in further detail below.

(4) Details of the Invention

The present invention relates to a website or mobile app and web accessible database, computer program product, computer implemented method, and data processing system that operate as a social networking and ecommerce website or mobile app. In general and as depicted in FIG. 1, the present invention includes one or more processors that are specifically configured to operate as follows. At initiation, the processor(s) receives user information 100 from a user to generate a unique user profile for the user. After generating and/or saving the user profile, the user is provided a first polling question 102 that has a finite set of answers and a unique identification.

The user is provided the polling question via a computer or other networked device. Thus, the system includes members (i.e., users) that answer polls with a finite set of answers (for example, ten; however, any number of answers can be included). Each user can only provide one answer to one poll. Each poll answer has a unique ID within that poll, starting at 0 and going to N–1 where N is the number of answers.

In providing the finite set of answers, the user can select one of the answers via any suitable selection method as is commonly employed through computing or mobile systems, such as highlighting an answer, checking a box, etc. Thereafter, the system receives and stores 104 a selected answer for the first polling question. The selected answer is then compared 106 against the selected profile descriptors of products, goods and/or services, based on the unique identification, (i.e., for that same question), to generate a likelihood of match between the user and each of the products, goods and services. Finally, the products, goods and/or services, based on the unique identification, that have a likelihood of match within a predetermined threshold are displayed 108 to the user via a monitor or other display device. As a non-limiting example, the top-five users or products, goods and services that most closely match the current user are presented to the current user in the form of an exact match number.

Each product, good, or service, is provided with one or more profile descriptors that are each assigned a unique identification (e.g., for that particular descriptor category). Profiles of products, goods and services have specific attributes and descriptions of the actual products, goods and services, which match to specific answer options on polls the users can answer Thus, the profile descriptors are descriptive attributes of a product, good, or service that can be loaded into the system to allow an administrator (or the system) to categorize each product, good or service for matching with users. Non-limiting examples of descriptive attributes are color, product category, price, size, new, used, shape, brand, affiliation, and demographic profiles (e.g., such, as those based on market research studies). For example, a blue basketball would have profile descriptors for "blue" and "basketball" and would be provided a unique identification for the color blue and a separate unique identification for the category of a ball. Other balls, such as a red basketball, may share the unique identification for the ball category, yet have a different unique identification for the color category. As a non-limiting example, when an administrator sets up the system, the administrator may categorize a blue basketball as having a unique identification for basketballs (such as a numerical identifier (e.g., 12345) or simply a category for basketballs), while also having a different and unique identification for the color blue (such as a numerical identifier (e.g., 6789) or a category for blue things). In this example, the red basketball, would be categorized to share the unique identification for basketballs (such as a numerical identifier (e.g., 12456) or basketball category), while also having a different and unique identification for the color red (such as a numerical identifier (e.g., 056) or category for red things). Similarly, a blue baseball bat may share the unique identification for the color blue (such as a numerical identifier (e.g., 6789) or the category for blue things), while also having a different and unique identification for the category of a baseball bat (such as a numerical identifier (e.g., 980) or baseball bat category). It should be noted that although the use of an administrator is provided as an example, the system is not intended to be limited thereto, as the products, goods, and services can be automatically categorized using categorization/recognition techniques known to those skilled in the art.

Alternatively and on the polling side, for example, a user could be asked "what type of gym equipment are you looking for?", with answers provided as "ball, bat, cleats, and sticks". If the user answers "ball", then the user is matched to the unique identification for the ball category, which results in all balls being matched to the user (e.g., red basketball and blue basketball). If the user then answers another question, such as "What is your favorite color?", with the user's response being blue, then the user is matched to the unique identifications for both "blue" and "basketball", with the blue basketball being matched to the user, or other users with the same answer(s).

As alluded to above, to more closely match users with similar products, goods and services the system cumulatively collects information regarding multiple polling questions. For example, the user is provided with a next polling question having a finite set of answers and a unique identification, with the system thereafter receiving and storing the selected answer. This process is repeated 110 for a plurality of next polling questions. Upon receipt of each answer, the selected answers for the user are cumulatively compared against all of the selected profile descriptors of all products, goods and services to generate the likelihood of match.

As can be appreciated by one skilled in the art, there are numerous techniques for determining a likelihood of match between a particular user and a product, good or service, a non-limiting example of which includes a match number. To determine the match number between particular users, or a product, good or service, the total number of polling questions as taken by the user and the profile descriptors as associated with a selected product, good or service, based on the unique identifications, is determined Next, the number of same selected answers/profile descriptors between the user and the selected products, goods and, services is determined. Finally, the number of same selected answers/profile descriptors can be displayed to generate the match number between users, and/or products, goods and services.

In other words, after a member answers a poll, the member is matched to all products, goods and/or services based upon the poll they just answered and all other polls they have previously answered. Their answers are compared to all users, or to the other products, goods and services, based on the unique identification. A match number is formed and reported back to the user (e.g., in descending order). The match algorithm allows for a maximum and minimum numbered match as well as a maximum number of hits. As a non-limiting example, the application may request that the match server return the top 20 members (or products, goods, and/or services) with a 3 to 17 match.

Figure 2:
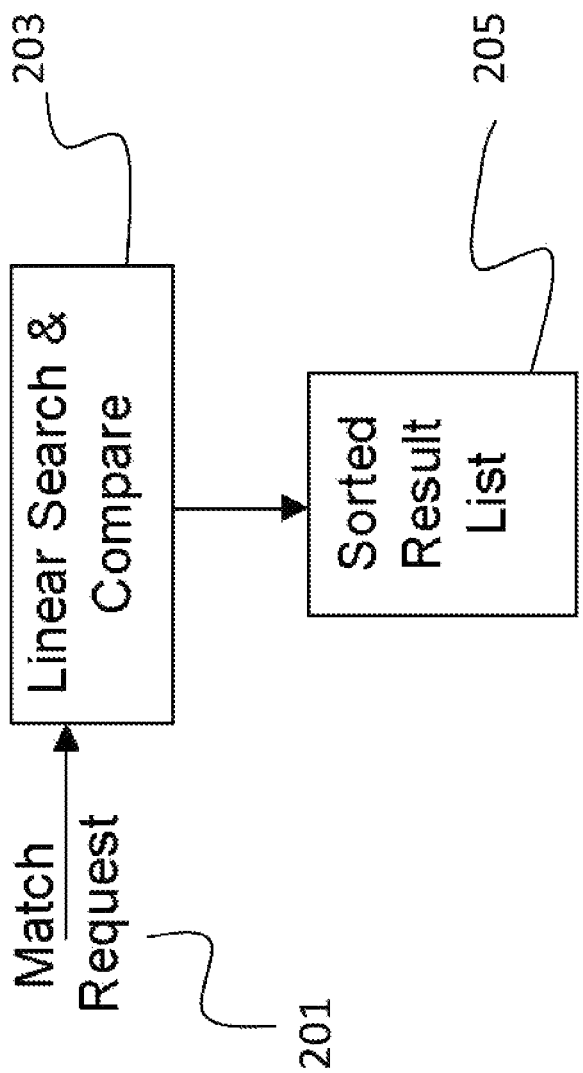
FIG. 2 is a flow chart depicting a general process according to the present invention.

The process by which the answers are stored and compared provides a unique function to the present invention that allows for nearly instant results. Generally speaking and as shown in FIG. 2, the system receives a match request 201, linearly searches and compares 203 a users selected answers against other products, goods and services, or general questions, and provides a sorted result list 205 which is used display the most relevant matches.

Figure 3:
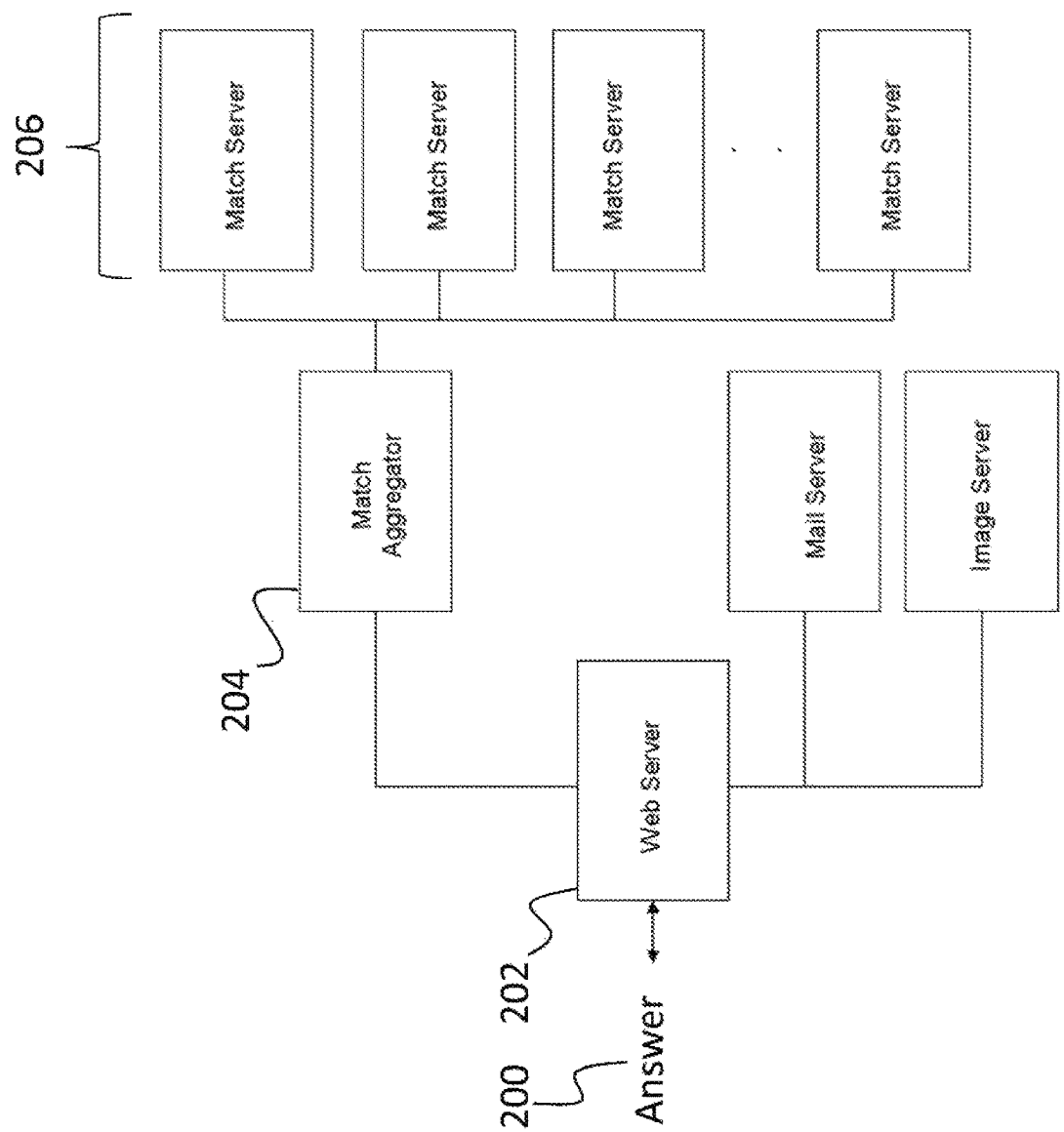
FIG. 3 is a flow chart depicting various components of the present invention.

As shown in FIG. 3, the selected answers 200 are collected with a web server 202 and stored in a database, a non-limiting example of which includes a MySQL database. The database can be stored in one form in memory and, in parallel, on disk. Upon receipt of a selected answer, the selected answer is separately transmitted, from the web server 202, through a match aggregator 204, to a single or plurality of match servers 206. Thus, the poll answers are transmitted to each of the match servers 204 as polls are answered, over a TCP/IP socket connection. In this manner all match servers 204 are kept synchronized.

Each match server 206 is assigned a distinct subset of the products, goods and services, based on the unique identification, such that each match server 206 compares the selected answer 200 of the user against the profile descriptors of its distinct subset to generate a likelihood of match between the users, and also the products, goods and services, based on the unique identification, in its distinct subset.

Figure 4:
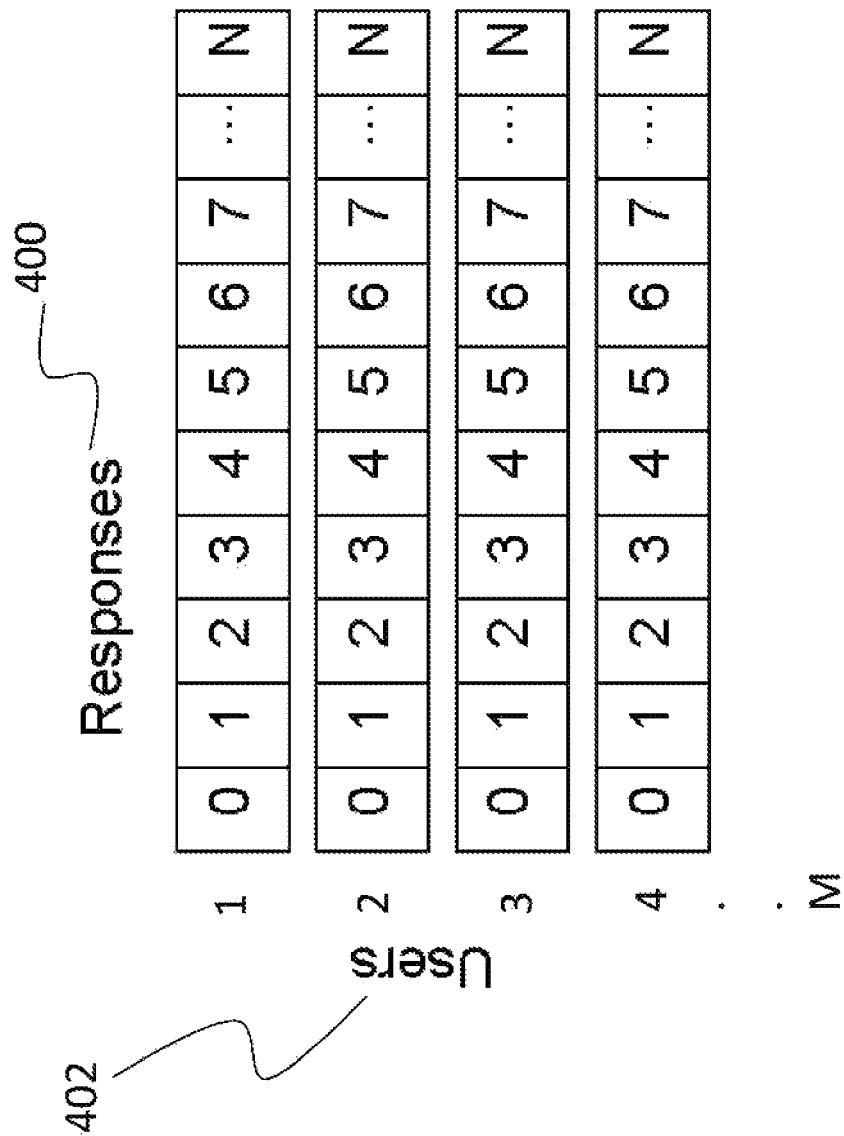
FIG. 4 is an illustration depicting an array as used by a match server of the present invention.

As shown in FIG. 4, in comparing the selected answer of the user against the profile descriptors of its distinct subset to generate a likelihood of match between the users, and also the products, goods and services, based on the unique identification in its distinct subset, each match server 206 stores selected answers 400 N as an in memory, two-dimensional array, with n bytes per selected answer 400 N and in rows per user 402 M. N is the number of responses (answers) and M is the number of products, goods and services, while n is the number of bytes per selected response and in is the number of row s per user. As can be appreciated by one skilled in the art, n and in are any real numbers. Although not limited thereto, the two-dimensional array desirably includes one byte per selected answer 400 N and one row per user 402 M. For example, if user 7 answers poll 5 with response 2, then the array row 7, byte 5 is set to 2. The response number 255 is reserved to indicate that the given poll has not yet been answered. As can be appreciated by one skilled in the art, the number 255 is arbitrary and is simply a marker for a non-answered question. This design allows for very rapid comparison and aggregation of result values even with a large number of polls and members and products, goods and services. The in-memory, two-dimensional array provides for linear speed across all match servers and an almost immediate comparison to determine if a particular user had a same answer to that of profile descriptors for the products, goods and services, based on the unique identification, with respect to a particular polling question. Thus, each match server can, quickly generate a likelihood of match between the user and the subset of products, goods and services, (distinct subsets).

Figure 5:
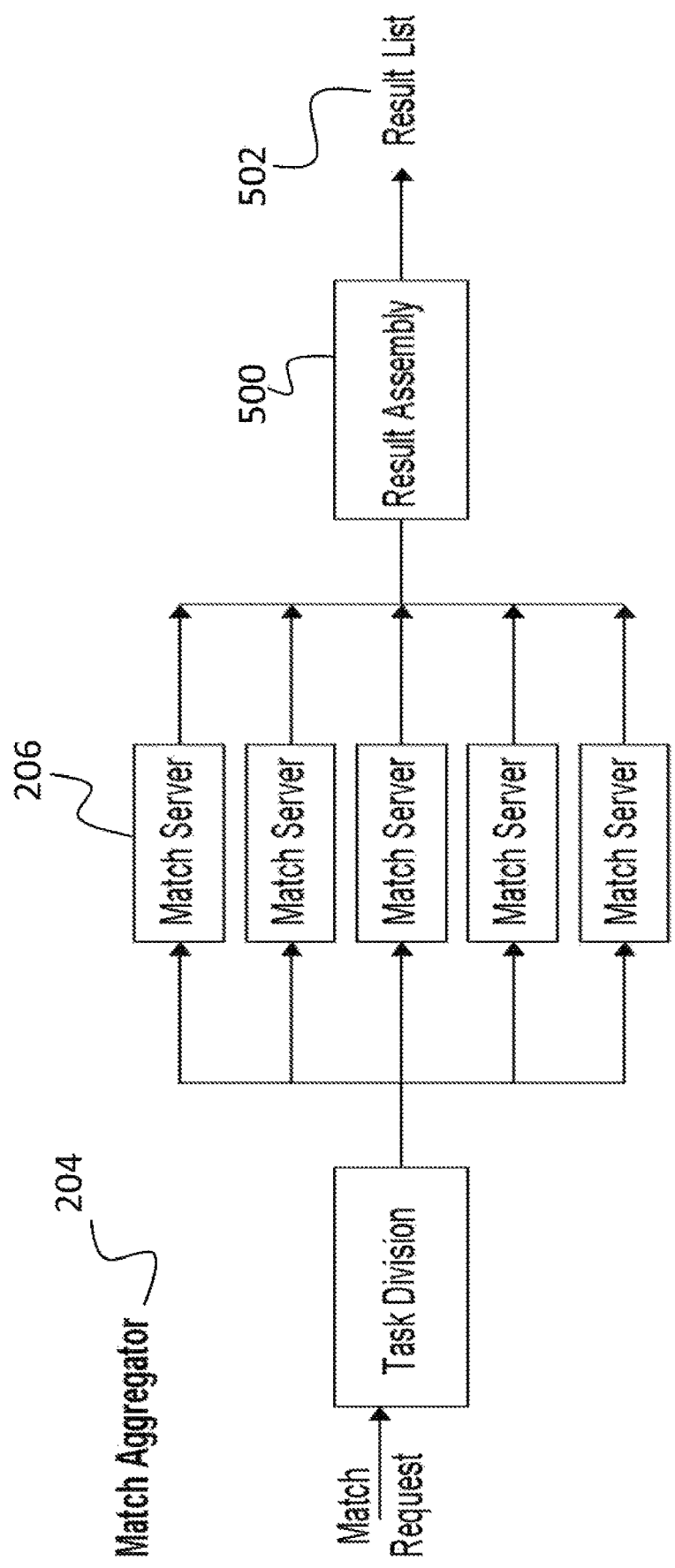
FIG. 5 is a flow chart depicting a process as implemented by a match aggregator according to the present invention.

Thereafter and as shown in FIG. 5, the match aggregator 204 receives from each match server 206 a likelihood of match between the user and its distinct subset (i.e., the likelihood of matches between the user and each of the products, goods and services, based on the unique identification, in each distinct subset). In a result assembly 500, the match aggregator 204 then compiles the likelihood of matches from the plurality of match servers 206 to generate the likelihood of match between the users, and also each of the products, goods and services, (which provides real time updates of the distributed match servers 206). The results are then organized into a result list 502 (e.g., ascending or descending order) which is then transmitted to the web server (i.e., element 202 in FIG. 3) for further processing. The web server 202 then displays to the user profiles other products, goods and services that are most similar or otherwise fall within the predetermined threshold.

The system consists of a single or multiple servers which can reside on the same or different physical machines. Each server is aware of the other servers by settings in a database. At startup, the servers load their base information from the database. Each match server is assigned a range of member IDs and products, goods and services IDs and only deals with matching those members. The match aggregator server farms out the match requests and re-aggregates them as the results arrive. The match aggregator is responsible for transmitting the member poll answer information to each server and then waiting for all results to be received, sorting those results and transmitting them back to the web server. By using a "divide and conquer" design, the system can scale to a nearly unlimited number of members and polls and products, goods and services. Due to Ethernet bandwidth limitations, a practical limit is about 1,000,000 polls answered per member; however it would take a person about 2 years to answer 1,000,000 polls if they answered one poll a minute 24 hours a day seven days a week.

Figure 6:
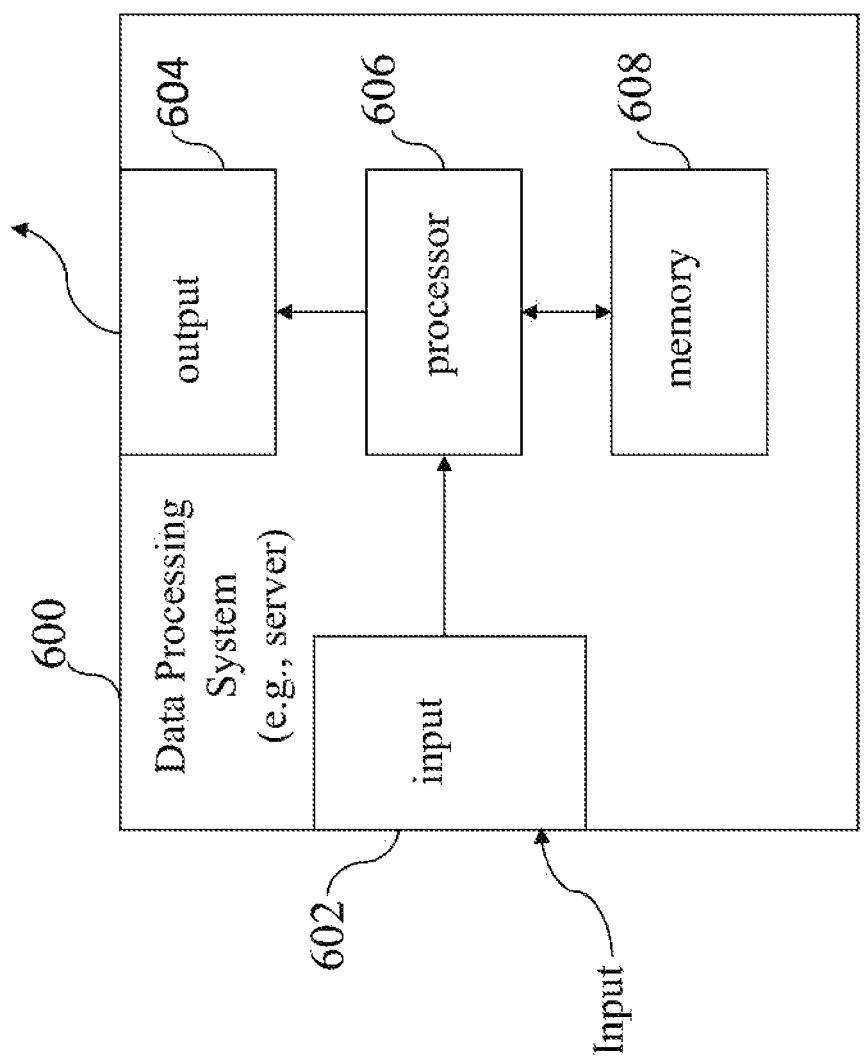
FIG. 6 is a block diagram depicting the components of a data processing system of the present invention.

A block diagram depicting the components of a poll-based networking and ecommerce system (or server) of the present invention is provided in FIG. 6. Each server 600 comprises an input 602 for, receiving information from a user (e.g., a polling answer, etc.). Note that the input 602 may include multiple "ports." Typically, input is received from a user or other servers. An output 604 is connected with the processor for providing user/match/answer information to other systems in order that a network of computer systems may serve as a poll-based networking system. Output may also be provided to other devices or other programs; e.g., to other software modules, for use therein. The input 602 and the output 604 are both coupled with a processor 606 (or processors), which may be a general-purpose computer processor or a specialized processor designed specifically for use with the present invention. The processor(s) 606 is coupled with a memory 608 to permit storage of data and software that are to be manipulated by commands to the processor 606.

Figure 7:
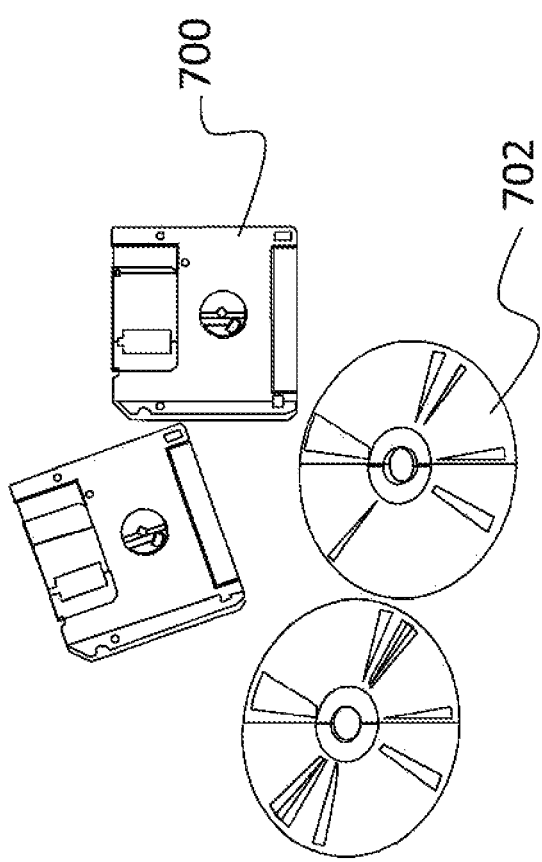
FIG. 7 is an illustration of a computer program product embodying the present invention.

An illustrative diagram of a computer program product embodying the present invention is depicted in FIG. 7. The computer program product is depicted as a floppy disk 700 or an optical disk 702 such as a CD or DVD. However, as mentioned previously, the computer program product generally represents computer-readable instructions stored on any compatible non-transitory computer-readable medium, or mobile phone.

Figure 8A:
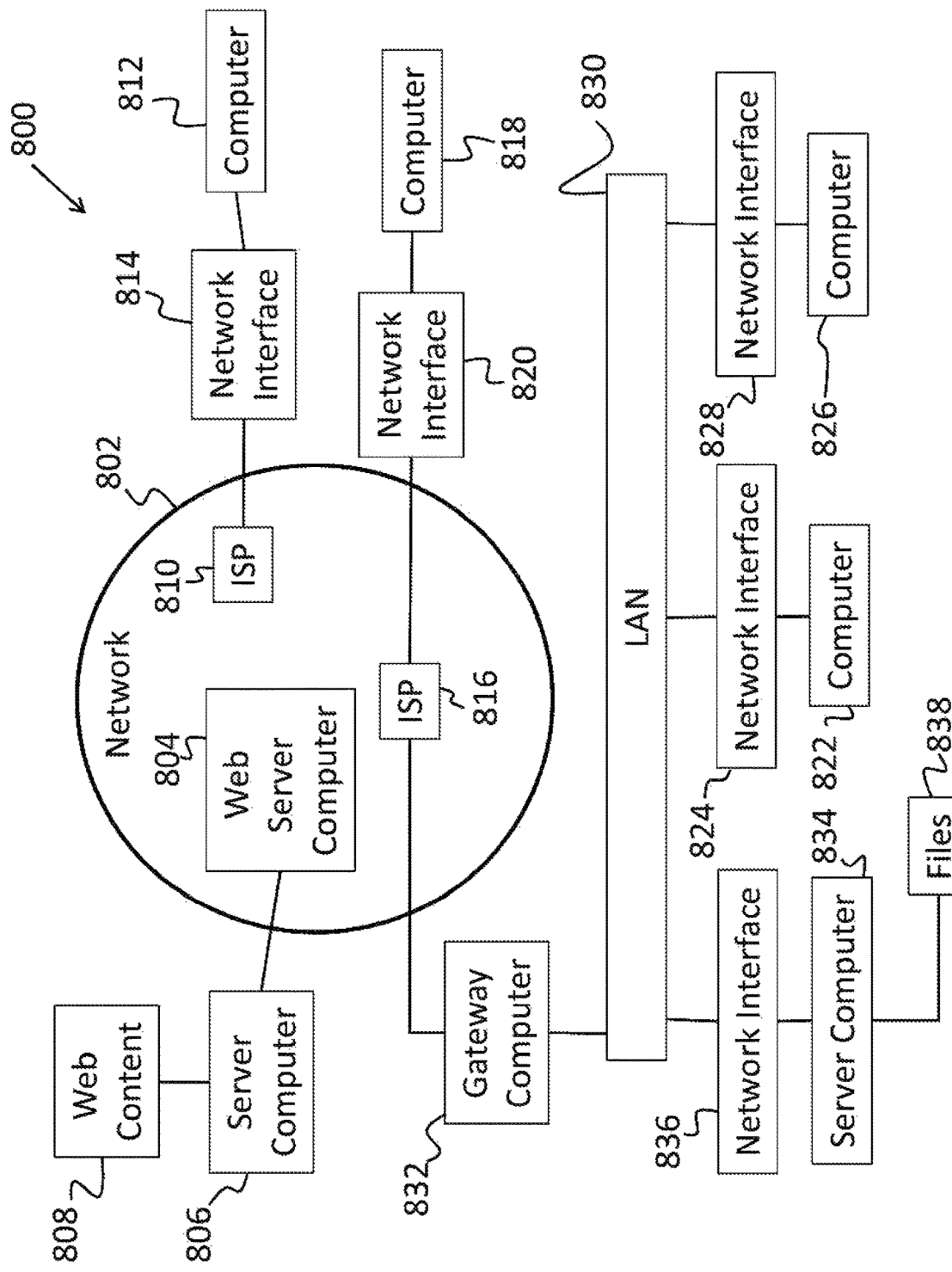
FIG. 8A is a conceptual view of a system on which one or more of the described aspects may be implemented.
Figure 8B:
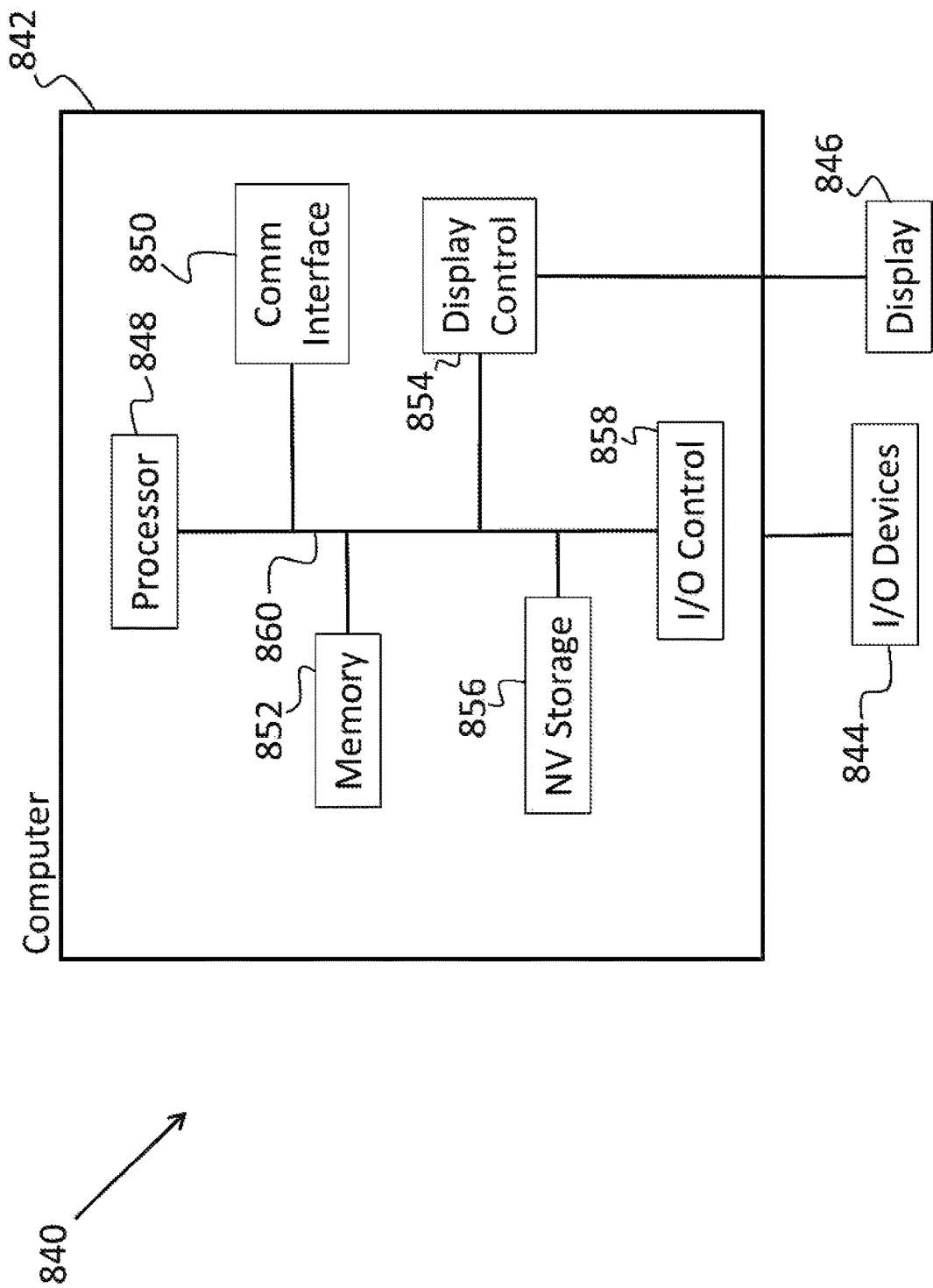
FIG. 8B is a conceptual view of a system according to the present invention.

FIGS. 8A and 8B depict a conceptual view of a system on which, by way of example but not limitation, one or more of the described embodiments may be implemented. The following description of FIGS. 8A and 8B is intended to provide an overview of computer hardware and other operating components suitable for performing the methods of embodiments described herein, but is not intended to limit the applicable environments. Similarly, the computer hardware and other operating components may be suitable as pan of the apparatuses of embodiments described herein. Other embodiments can be practiced with other computer system configurations, including hand-held devices, multiprocessor systems, microprocessor-based or programmable consumer electronics, network PCs, minicomputers, mainframe computers, and the like. Other embodiments can also be practiced in distributed computing environments where tasks are performed by remote processing devices that are linked through a communications network.

FIG. 8A depicts a networked system 800 that includes several computer systems coupled together through a network 802, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents, that make up the World Wide Web (the web). The physical connections of the Internet and the protocols and communication procedures of the Internet are well known to those of skill in the art.

The web server computer 804 (also depicted as element 202 in FIG. 3) is typically at least one computer system which operates as a server computer system and is configured to operate with the protocols of the World Wide Web and is coupled to the Internet. The web server computer 804 can be a conventional server computer system. Optionally, the web server computer 804 can be part of an ISP which provides access to the Internet for member systems. The web server computer 804 is shown coupled to the server computer 806 which itself is coupled to web content 808, which can be considered a form of a media database. While two computers 804 and 806 are shown in FIG. 8A, the web server computer 804 and the server computer 806 can be one computer system having different software components providing the web server functionality and the server functionality provided by the server computer 806, which will be described further below. Further, the web server computer 804 can be inclusive of the match aggregator and/or match server or connected with the match aggregator, etc., as depicted in FIG. 3.

Access, to the network 802 is typically provided by Internet service providers (ISPs), such as the ISPs 810 and 816. Users on member systems, such as member computer systems 812, 818, 822, and 826 obtain access to the Internet through the ISPs 810 and 816. Access to the Internet allows users of the member computer systems to exchange information, receive and send e-mails, and view documents, such as documents which have been prepared in the HTML format. These documents are often provided by web servers, such as web server 804, which are referred to as being "on" the Internet. Often these web servers are provided by the ISPs, such as ISP 810, although a computer system can be set up and connected to the Internet without that system also being an ISP.

Member computer systems 812, 818, 822, and 826 can each, with the appropriate web browsing software, view HTML pages provided by the web server 804. The ISP 810 provides Internet connectivity to the member computer system 812 through the network interface 814 (e.g., modem, T1, cable, wireless, etc.), which can be considered part of the member computer system 812. The member computer system can be a personal computer system, a network computer, a web TV system, or other computer system. While FIG. 8A shows the network interface 814 generically as a "modem," the interface can be an analog modem, ISDN modem, cable modem, satellite transmission interface (e.g. "direct PC"), wireless, T1, or any other interface for coupling a computer system to other computer systems.

Similar to the ISP 814, the ISP 816 provides Internet connectivity for member systems 818, 822, and 826, although as shown in FIG. 8A, the connections are not the same for these three computer systems. Member computer, system 818 is coupled through a network interface 820 while member computer systems 822 and 826 are part of a LAN 830.

Member computer systems 822 and 826 are coupled to the LAN 830 through network interfaces 824 and 828, which can be Ethernet network or other network interfaces. The LAN 830 is also coupled to a gateway computer system 832 which can provide firewall and other Internet-related services for the local area network. This gateway computer system 832 is coupled to the ISP 816 to provide Internet connectivity to the member computer systems 822 and 826. The gateway computer system 832 can be a conventional server computer system.

Alternatively, a server computer system 834 can be directly coupled to the LAN 830 through a network interface 836 to provide files 838 and other services to the members 822 and 826, without the need to connect to the Internet through the gateway system 832.

FIG. 8B depicts another example of a computer system 840 for use in the system 800 (FIG. 8A). The computer system 840 may be a conventional computer system that can be used as a member computer system or a server computer system or as a web server computer system. Such a computer system can be used to perform many of the functions of an Internet service provider, such as ISP 810 (FIG. 8A). The computer system 840 includes a computer 842, 110 devices 844, and a display device 846. The computer 842 includes a processor 848, a communications interface 850, memory 852, display controller 854, non-volatile storage 856, and I/O controller 858. The computer system 840 may be couple to or include the I/O devices 844 and display device 846.

The computer 842 interfaces to external systems through the communications interface 850, which may include a modem or network interface. It will be appreciated that the communications interface 850 can be considered to be part of the computer system 840 or a part of the computer 842. The communications interface can be an analog modem, isdn modem, cable modem, token ring interface, satellite transmission interface (e.g. "direct PC"), or other interfaces for coupling a computer system to other computer systems.

The processor 848 may be, for example, a conventional microprocessor such as an Intel Pentium microprocessor or Motorola power PC microprocessor. The memory 852 is coupled to the processor 848 by a bus 860. The memory 852 can be dynamic random access memory (DRAM) and can also include static ram (SRAM). The bus 860 couples the processor 848 to the memory 852, also to the non-volatile storage 856, to the display controller 854, and to the I/O controller 858.

The I/O devices 844 can include a keyboard, disk drives, printers, a scanner, and other input and output devices, including a mouse or other pointing device. The display controller 854 may control in the conventional manner a display on the display device 846, which can be, for example, a cathode ray tube (CRT) or liquid crystal display (LCD). The display controller 854 and the I/O controller 858 can be implemented with conventional well known technology.

The non-volatile storage 856 is often a magnetic hard disk, an optical disk, or another form of storage for large amounts of data. Some of this data is often written, by a direct memory access process, into memory 852 during execution of software in the computer 842. One of skill in the art will immediately recognize that the terms "machine-readable medium" or "computer-readable medium" includes any type of storage device that is accessible by the processor 848 and also encompasses a carrier wave that encodes a data signal.

The computer system 840 is one example of many possible computer systems which have different architectures. For example, personal computers based on an Intel microprocessor often have multiple buses, one of which can be an I/O bus for the peripherals and one that directly connects the processor 848 and the memory 852 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 852 for execution by the processor 848. A Web TV system, which is known in the art, is, also considered to be a computer system according to the present invention, but it may lack some of the features shown in FIG. 88B, such as certain input or output devices. A typical computer system will usually include at least a processor, memory, and a bus coupling the memory to the processor.

In addition, the computer system 840 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 856 and causes the processor 848 to execute the various acts required by the operating system to input and output data and to store data in memory, including storing files on the non-volatile storage 856.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instruction means, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description provided, herein. In addition, the present invention is not described with reference to any particular programming language, and various embodiments may thus be implemented using a variety of programming languages.

While a number of exemplary aspects and embodiments have been discussed above, those of skill in the art will recognize certain modifications, permutations, additions, and sub-combinations thereof. It is therefore intended that any claims hereafter introduced based upon these descriptions and drawings are interpreted to include all such modifications, permutations, additions, and sub-combinations as are within their true spirit and scope.

(5) Conclusion

In summary, the present invention improves upon the prior art by providing a poll-based networking system and ecommerce system that provides users with a series of polling questions and matches users to each other, and also to products, goods and services, based on the unique identification to the polling, questions. In operation, the system uses a distributed architecture of match servers and a match aggregator. An in-memory array is used for comparing poll answers and aggregating results in real time, which provides for real-time updates of the distributed servers. Through the in-memory array, the system displays to the user, in real-time, products, goods and services, based upon all of the polls taken.

What is claimed is:

1. A poll-based networking and ecommerce system, comprising:

one or more processors, each of the one or more processors having an associated memory specifically encoded with instructions such that when executed, the instructions cause the one or more processors to collectively perform operations of:

receiving user information from a user to generate a unique user profile for the user;

providing the user one or more polling questions, the one or more polling questions having a finite set of answers and a unique identification; receiving and storing a selected answer for the one or more polling questions: first comparing the selected answer against the selected answers of other users, based on the unique identification, to generate a likelihood of match between the user and each of the other users: causing to be displayed to the user other users, or the products, goods or services that have a likelihood of match within a predetermined threshold; wherein one or more of the operations are carried out on a hand-held device: and wherein two or more results based on the likelihood of match are displayed in a list reviewable by swiping from one result to another.

2. A computer-implemented method for creating a poll-based network, the method comprising an act of causing one or more processors having an associated memory specifically encoded with computer executable instruction means to execute the instruction means to cause the one or more processors to collectively perform operations of: receiving user information from a user to generate a unique user profile for the user;

providing the user one or more polling questions, the one or more polling questions having a finite set of answers and a unique identification;

receiving and storing a selected answer for the one or more polling questions;

comparing the selected answer against the selected answers of other users, based on the unique identification, to generate a likelihood of match between the user and each of the other users;

causing to be displayed to the user other users, that have a likelihood of match within a predetermined threshold; wherein one or more of the operations are carried out on a hand-held device; and wherein two or more results based on the likelihood of match are displayed in a list reviewable by swiping from one result to another.

3. A computer program product for creating a poll-based network, the computer program product comprising computer-readable instruction means stored on a non-transitory computer-readable medium that are executable by one or more processors for causing the one or more processors to collectively perform operations of:

receiving user information from a user to generate a unique user profile for the user;

providing the user one or more polling questions, the one or more polling questions having a finite set of answers and a unique identification;

receiving and storing a selected answer for the one or more polling questions:

causing to be displayed to the user other users, that have a likelihood of match within a predetermined threshold;

wherein one or more of the operations are carried out on a hand-held device; and wherein two or more results based on the likelihood of match are displayed in a list reviewable by swiping from one result to another.

4. The poll-based networking system as set forth in claim 1, wherein the user and each of the other users have a same gender.

5. The poll-based networking system as set forth in claim 1, wherein the gender is male.

6. The poll-based networking system as set forth in claim 1, wherein the gender is female.

7. The poll-based networking system as set forth in claim 1, wherein more than ten polling questions are provided to the user.

8. The poll-based networking system as set forth in claim 1, wherein less than ten polling questions are provided to the user.

9. The poll-based networking system as set forth in claim 1, wherein at least one of the answers to the polling questions are displayed to the other user.

10. The poll-based networking system as set forth in claim 1, wherein more than one of the answers to the polling questions are displayed to the other user.

11. The poll-based networking system as set forth in claim 1, wherein the one or more processors are remote processing devices that are linked through a communications network such that the operations are practiced in a distributed computer environment.

12. The computer implemented method as set forth in claim 2, wherein the user and each of the other users have a same gender.

13. The computer implemented method as set forth in claim 2, wherein the gender is female.

14. The computer implemented method as set forth in claim 2, wherein the gender is male.

15. The computer implemented method as set forth in claim 2, wherein more than ten polling questions are provided to the user.

16. The computer implemented method as set forth in claim 2, wherein less than ten polling questions are provided to the user.

17. The computer implemented method as set forth in claim 2, wherein at least one of the answers to the polling questions are displayed to the other user.

18. The computer implemented method as set forth in claim 2, wherein more than one of the answers to the polling questions are displayed to the other user.

19. The computer implemented method as set forth in claim 2, wherein the one or more processors are remote processing devices that are linked through a communications network such that the operations are practiced in a distributed computer environment.

20. The computer program product as set forth in claim 3, wherein the user and each of the other users have a same gender.

21. The computer program product as set forth in claim 3, wherein the gender is female.

22. The computer program product as set forth in claim 3, wherein the gender is male.

23. The computer program product as set forth in claim 3, wherein more than ten polling questions are provided to the user.

24. The computer program product as set forth in claim 3, wherein less than ten polling questions are provided to the user.

25. The computer program product as set forth in claim 3, wherein at least one of the answers to the polling questions are displayed to the other user.

26. The computer program product as set forth in claim 3, wherein more than one of the answers to the polling questions are displayed to the other user.

27. The computer program product as set forth in claim 3, wherein the one or more processors are remote processing devices that are linked through a communications network such that the operations are practiced in a distributed computer environment.

* * * * *